(12) United States Patent
Beeteson et al.

(10) Patent No.: US 6,275,254 B1
(45) Date of Patent: Aug. 14, 2001

(54) AUTO-STEREOSCOPIC DISPLAY DEVICE AND SYSTEM

(75) Inventors: John Beeteson, Skelmorlie; Andrew Knox, Kilbirnie, both of (GB)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 08/778,322

(22) Filed: Jan. 2, 1997

(30) Foreign Application Priority Data

Jun. 15, 1996 (GB) .................................................. 9612578

(51) Int. Cl.[7] ...................................................... H04N 9/47
(52) U.S. Cl. ........................... 348/59; 313/495; 313/409; 313/422; 313/446; 345/139; 359/458; 359/462
(58) Field of Search ......................... 348/54, 59; 345/74, 345/75; 359/463; 315/366

(56) References Cited

U.S. PATENT DOCUMENTS

| | | | |
|---|---|---|---|
| 4,618,801 | * 10/1986 | Kakino | 313/495 |
| 4,959,641 | * 9/1990 | Bass et al. | 340/700 |
| 4,973,888 | * 11/1990 | Morimoto et al. | 315/366 |
| 5,317,393 | 5/1994 | Lee . | |
| 5,495,576 | * 2/1996 | Ritchey | 395/125 |
| 5,565,742 | * 10/1996 | Shichao et al. | 315/366 |
| 5,633,650 | * 5/1997 | Kishino et al. | 345/74 |
| 5,721,561 | * 2/1998 | Kishino et al. | 345/75 |
| 5,726,800 | * 3/1998 | Ezra et al. | 359/466 |
| 5,739,634 | * 4/1998 | Kinoshita et al. | 345/75 |

FOREIGN PATENT DOCUMENTS 2 183 900   6/1987 (GB) .
2 271 464   4/1994 (GB) .

* cited by examiner

*Primary Examiner*—Chris Kelley
*Assistant Examiner*—Shawn S. An
(74) *Attorney, Agent, or Firm*—George E. Grosser; Andrew Dillon

(57) ABSTRACT

An auto-stereoscopic display device comprises a plane viewing screen, a plane cathode, and a plane permanent magnet. A two dimensional array of rows and columns of channels extends between opposite poles of the magnet for receiving electrons from the cathode. A phosphor layer is disposed between the screen and the magnet and having a plurality of pixels each corresponding to a different channel. Grid electrode means is disposed between the cathode and the magnet for selectively controlling flow of electrons from the cathode through each channel to the corresponding pixel in response to input video data. Deflection anode means is disposed on the side of the magnet remote from the cathode for sequentially deflecting, orthogonally to the columns, each electron beam to different parts of the corresponding pixel in response to an input video clock signal. A lenticular lens array is disposed between the phosphor layer and the screen and having a plurality of cylindrical lenses each corresponding to a different column of pixels.

7 Claims, 4 Drawing Sheets

AUTO-STEREOSCOPIC DISPLAY DEVICE AND SYSTEM

BACKGROUND OF THE INVENTION

1. Field of the Invention

The present invention relates to an auto-stereoscopic display system and auto-stereoscopic display device for inclusion in such a system.

2. Background Description

Three dimensional or stereoscopic images may be produced via holographic, volumetric, or multi-view techniques. A conventional multi-view technique involves viewing a frame sequential pair of images with specially adapted glasses. Specifically, a display device present alternate left and right views to the observer on a frame sequential basis. The glasses worn by the observer effectively route the views to each eye. Shutters or polarisers in the glasses are synchronised to the frame rate to control the routing. To prevent flicker, the frame rate must be doubled or the resolution halved with respect to the two dimensional equivalent image. A disadvantage with such as system is that the two images produce only a limited "look around" capability. Furthermore, glasses have to be worn to produce any effect.

Another conventional multi-view technique involves a barrier auto-stereoscopic display system. In some examples of such a system, a stereo pair of images is sliced into vertical strips. The strips of each image of the pair are meshed together on the display screen. A physical barrier is placed in front of the display screen. Small viewing zones are formed in the barrier so that the left eye can see only strips of the first image of the pair and the right eye can see only strips of the second image of the pair. The observer re-constructs the full image in three dimensions. A disadvantage with this arrangement is that the viewing zone is very narrow. Outside the zone, the observer sees multiple images or a stereo inversion. Furthermore, there is no "look around" effect. In a modification to the physical barrier system, the barrier is replaced by a lenticular lens screen having an array of vertical cylindrical lenses each corresponding to a different pair of left and right view strips.

The lenticular screen approach can be enhanced by assigning further image strips to each lens. For example, if each lens corresponds to four views (from four cameras instead of two) then repeating double viewing zones are generated instead of the repeating single viewing zone associated with the basic method described earlier. If the observer moves to the left of the display screen, a new image, to left of the previous image, is observed. The number of reverse stereo zones is reduced. Specifically, reverse stereo zones are produced only at the point where multiple zones repeat. The latitude of head movement is improved with increasing number of views. Each different view can be employed to simulate "look around" effects. A disadvantage with four view systems is that as the observer moves from the first view to the second view, the spatial resolution of the system causes a jump in continuity. In general, experiment suggests that 16 views are sufficient to produce satisfactory three dimensional viewing.

In an example of a conventional multi-view system, there is provided a 16 view time-multiplexed cathode ray tube (CRT) display comprising a slit shutter disposed at a distance of around 30 cm in front of the screen. A disadvantage with this time division arrangement is that the display system is required to operate at high CRT scan frequencies (greater than 150 kHz), very high EHT voltages (greater than 30 kV), and very fast phosphors. Furthermore, the spacing between the CRT and the shutter produces a cumbersome construction.

It is desirable in a multi-view lenticular system to display each view in relatively narrow stripes. The thickness of the stripe is dependent on the spot size of the display. Liquid crystal display (LCD) panels have a relatively large spot size. Relatively small spot sizes can be achieved in conventional CRTs. However, to achieve such spot sizes in a CRT, relatively high EHT voltages, fast video amplifiers, and fast phosphors are required, leading to added circuit complexity, power consumption, and manufacturing cost. Furthermore, for optimum results, the lenticular screen is preferably located close to a flat image source. The thickness and curvature of many conventional CRTs therefore renders them unsuitable.

It would be desirable to provide a new stereoscopic display technology in which the aforementioned problems associated with conventional stereoscopic display technologies such as LCD and CRT are solved.

SUMMARY OF THE INVENTION

In accordance with the present invention there is now provided an auto-stereoscopic display device comprising: a plane viewing screen; a plane cathode; a plane permanent magnet; a two dimensional array of rows and columns of channels extending between opposite poles of the magnet for receiving electrons from the cathode; a phosphor layer disposed between the screen and the magnet and having a plurality of pixels each corresponding to a different channel; grid electrode means disposed between the cathode and the magnet for selectively controlling flow of electrons from the cathode through each channel to the corresponding pixel in response to input video data; deflection anode means for sequentially deflecting, orthogonally to the columns, each electron beam to different parts of the corresponding pixel in response to an input video clock signal; and a lenticular lens array disposed between the phosphor layer and the screen and having a plurality of cylindrical lenses each corresponding to a different column of pixels.

The phosphor coating may be deposited on the side of the lens array remote from the screen. Alternatively, the phosphor coating may be deposited on a barrier disposed between the deflection anodes and the lens array. The barrier preferably comprises a glass layer secured to the lens array.

In preferred embodiments of the present invention, there is provided interpolating means for interpolating between different views in the video input data to generate one or more additional views.

It will be appreciated that the present invention extends to an auto-stereoscopic display system comprising a display device as hereinbefore described, a video data source for generating the input video data and the video clock signal, and a communication link for transferring the input video data and the video clock signal from the video data source to the display device.

Preferably, the communication link comprises compression means for compressing the input video data for transfer from the video source to the display device.

BRIEF DESCRIPTION OF THE DRAWINGS

Preferred embodiments of the present invention will now be described by way of example only with reference to the accompanying drawings in which.

DETAILED DESCRIPTION OF PREFERRED EMBODIMENTS OF THE INVENTION

Figure 1:
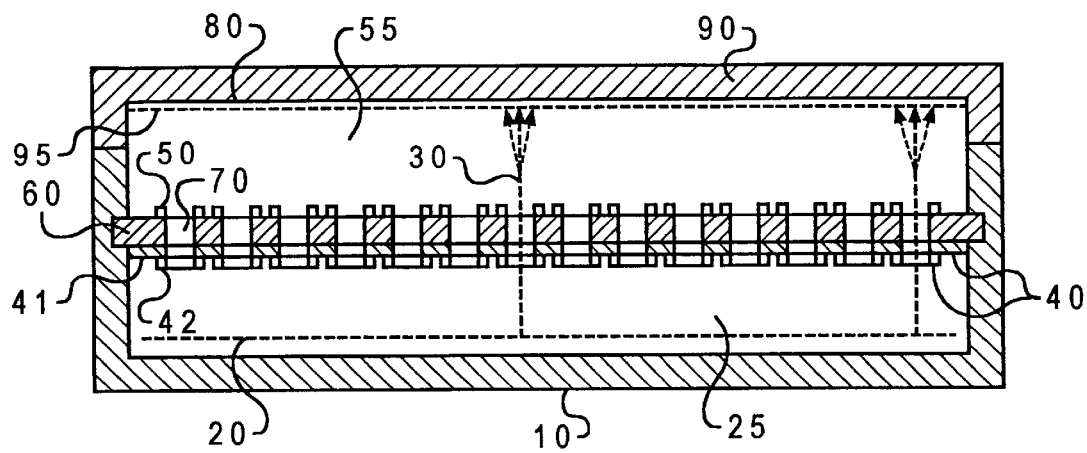
FIG. 1 is a cross-sectional view of an example of a magnetic matrix display device.

Referring now to FIG. 1, an example of a magnetic matrix display device comprises a first glass plate 10 and a second glass plate 90. An area cathode 20 is disposed between plates 10 and 90. A layer of sequentially arranged red, green and blue phosphor stripes 80 are disposed on plate 90 facing cathode 20. The phosphors are preferably high voltage phosphors. A final anode layer 95 is disposed on phosphors 80. A permanent magnet 60 is disposed between cathode 20 and phosphors 80. Magnet 60 is perforated by a two dimension matrix of apertures or "pixel wells" 70. An array of anodes 50 are formed on the surface of the magnet 60 facing the phosphors 80. For the purposes of explanation of the operation of the display, this surface will be referred to as the top of the magnet 60 and the region between phosphors 80 and anodes 50 will be referred to as the anode region 55. There is a pair of anodes 50 associated with each column of the matrix of pixel wells 70. The anode of each pair extend along opposite sides of the corresponding column of pixel wells 70. A control grid 40 is formed on the surface of the magnet 60 facing the cathode 20. For the purposes of explanation of the operation of the display, this surface will be referred to as the bottom of the magnet 60. The control grid 40 comprises a first group of parallel control grid conductors extending across the magnet surface in a column direction and a second group of parallel control grid conductors extending across the magnet surface in a row direction so that each pixel well 70 is situated at the intersection of a different combination of a row grid conductor 41 and a column grid conductor 42. During manufacture, plates 10 and 90, and magnet 60 are brought together, sealed and then the whole is evacuated.

Figure 2:
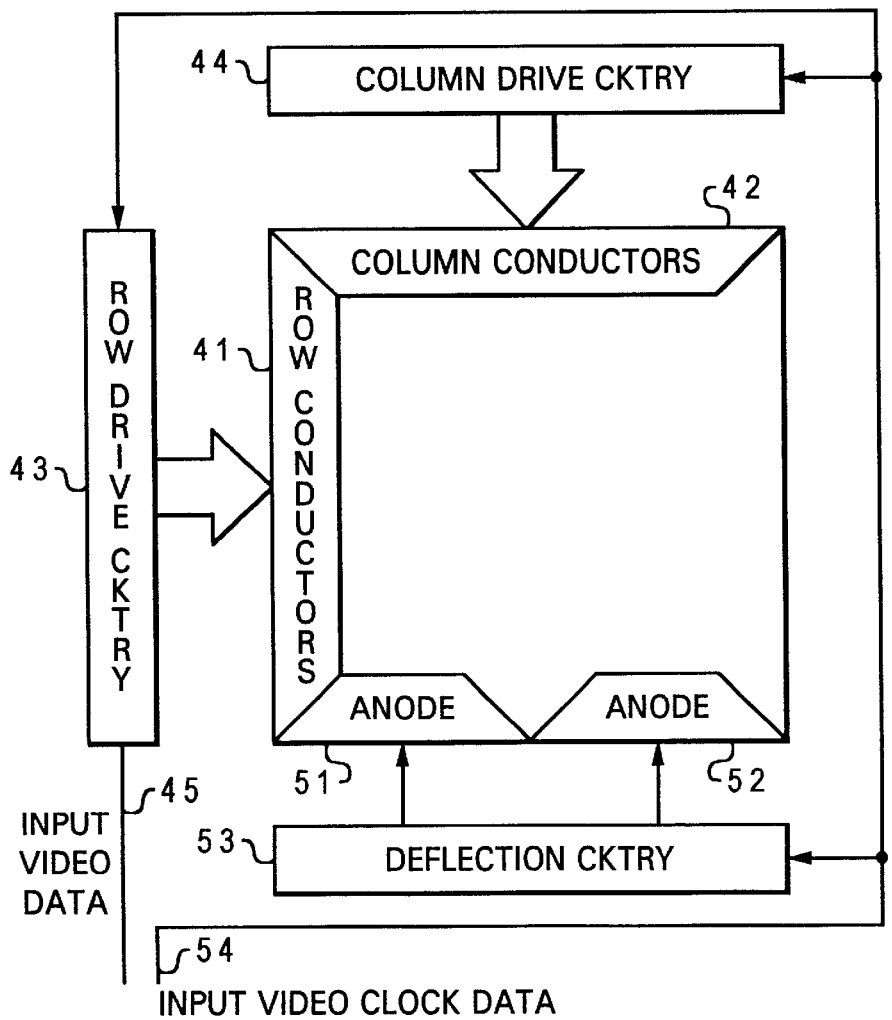
FIG. 2 is a block diagram of the display device.

Referring now to FIG. 2, deflection circuitry 53 is connected to anodes 51 and 52; column drive circuitry 44 is connected to column conductors 42; and, row drive circuitry 43 is connected to row conductors 41. Input video data 45 is connected to row drive circuitry 43. Input video clock data 54 is connected to row drive circuitry 43, column drive circuitry 44, and deflection circuitry 53.

In operation, electrons are released from cathode 20 and attracted towards control grid 40. Control grid 40 provides a row/column matrix addressing mechanism for selectively admitting electrons to each pixel well 70. Electrons pass through grid 40 into an addressed pixel well 70. In each pixel well 70, there is an intense magnetic field. The intense magnetic field causes electrons to travel through each well 70 along a helical path. Electrons entering each well 70 are collimated by the magnetic field to form a dense electron beam 30. The pair of anodes 50 at the top of pixel well 70 accelerate the electrons through pixel well 70 and provide selective sideways deflection of the emerging electron beam 30. Electron beam 30 is then accelerated towards higher voltage (typically 10 kV) final anode 95 on plate 90 to produce a high velocity electron beam 30 having sufficient energy to penetrate the anode and reach the underlying phosphors 80 resulting in light output. Each column of pixel wells 70 corresponds to a different set of red, green and blue phosphor stripes.

Video input data 45 is applied to row conductors 41 via row drive circuitry 43. Column drive circuitry 44 sequentially enables successive columns of pixels. For each column of pixels enabled, row drive circuitry 43 simultaneously applies video data to each of row conductors 41. The next column of pixels is then enabled by column drive circuitry 44. Row drive circuitry 43 now applies the video data corresponding to the next column of pixels to row conductors 41. This scan process continues until the last column of pixels is reaches. Clock signal 54 synchronises row drive circuitry 43 and column drive circuitry 44 to input video data 45. The entire process is then repeated for the next frame of input video data 45.

Anodes 51 and 52 on either side of the exit from the pixel well 70 are individually controllable by the deflection circuitry 53. Anodes 51 and 52 are preferably arranged in a comb configuration in the interests of easing fabrication. There are four possible states for anodes 51 and 52, as follows.

1. Anode 51 is OFF; Anode 52 is OFF: there is no accelerating voltage between the cathode 20 and the anodes 51 and 52. This state is not used in normal operation of the display.
2. Anode 51 is ON; Anode 52 is ON: there is accelerating voltage symmetrically about the electron beam. The electron beam path is unchanged. The electrons continue until they strike the Green phosphor.
3. Anode 51 is OFF; Anode 52 is ON: there is an asymmetrical control anode voltage. The electrons are attracted towards the energised anode 52 (which is still providing an accelerating voltage relative to the cathode 20). Electron beam 30 is thus electrostatically deflected towards the Red phosphor.
4. Anode 51 is ON; Anode 52 is OFF: This is the opposite to 3. above. electron beam 30 is deflected towards the Blue phosphor.

Deflection circuitry 53 is arranged to drive anodes 51 and 52 in states 2, 3, and 4 above. In operation, for each column enabled by columns drive circuitry 44, anodes 51 and 52 are energised by the deflection circuitry to scan or "index" electron beam 30 from each pixel well 70 successively across the Red, Green and Blue phosphors of the corresponding set of phosphor stripes 80. Red, Green and Blue video data, is sequentially gated by row drive circuitry 43 onto the row conductors 41 in synchronisation with beam indexing waveforms produced by the deflection circuitry 53. Column drive circuitry 44 thus sequentially selects each successive pixel in given row. Deflection circuitry 53 thus sequentially selects each sub-pixel of a pixel selected by column drive circuitry 44.

As mentioned earlier, the display has cathode means 20, grid or gate electrodes 40, and an anode 95. The arrangement can thus be regarded as a triode structure. For the purpose of explanation, the region between magnet 60 and cathode 20 will hereinafter be referred to as the triode region 25. Electron flow from cathode 20 is regulated by grid 40 thereby controlling the current flowing to the anode.

Figure 3:
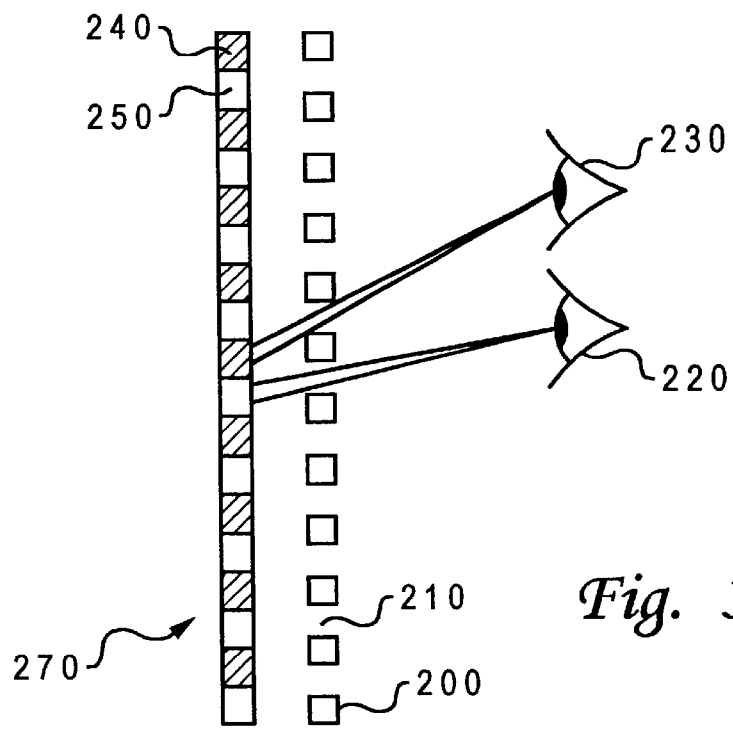
FIG. 3 is a side view of a parallax barrier stereoscopic display.

Referring now to FIG. 3, in a conventional multi-view barrier auto-stereoscopic display system, a barrier 200 is disposed in front of a display screen 270. The left and right images of a stereo pair of images are sliced into vertical strips. The strips 250 of the left image and the strips 240 of the right image are alternately disposed on screen 270. Slots 210 are formed in barrier 200. Slots 210 are positioned so that the left eye 220 of an observer can see only strips 250 of the left image and the right eye 230 can see only strips 240 of the right image of the pair. The observer reconstructs the full image in three dimensions.

Figure 4:
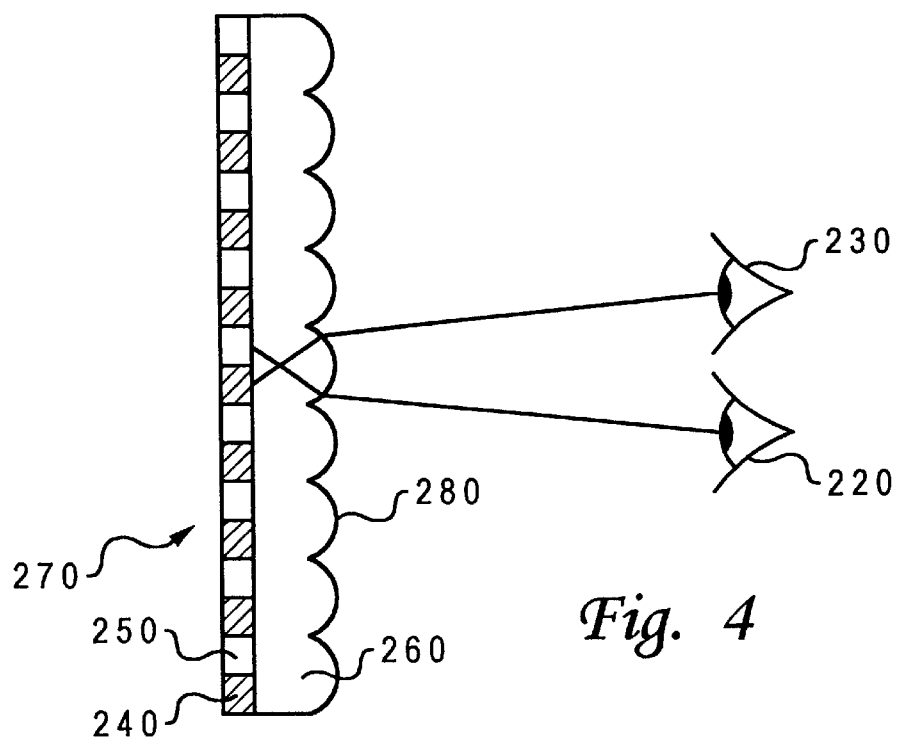
FIG. 4 is a side view of a lenticular stereoscopic display.

Referring now to FIG. 4, in a modification to the FIG. 3 arrangement, barrier 200 is replaced by a lenticular lens screen 260 having an array of vertical cylindrical lenses 280 each corresponding to a different pair of left and right image strips 250 and 240. In operation each lens directs the left eye 220 of an observer onto a left image strip 250 and the right eye 230 of the observer onto a right image strip 240.

Figure 5:
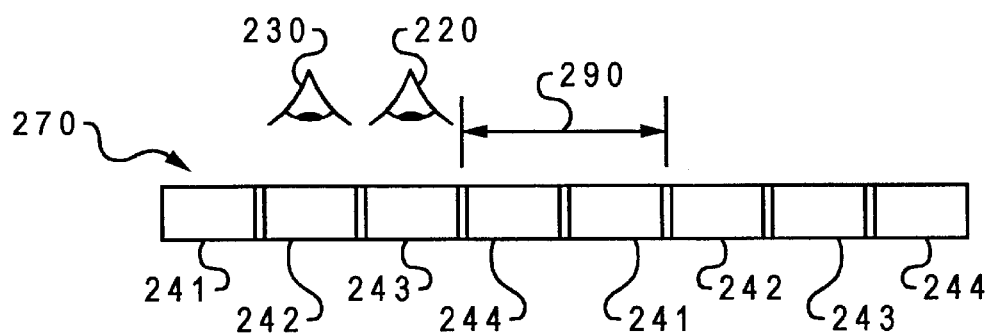
FIG. 5 is a side view of a four view stereoscopic image
Figure 6:
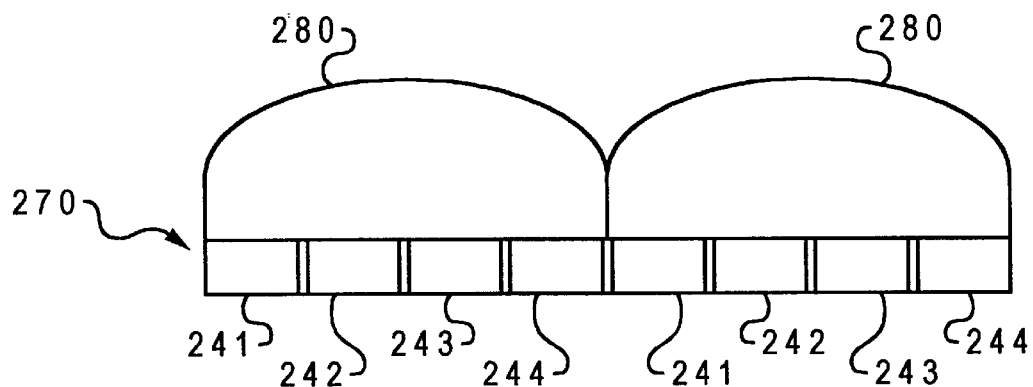
FIG. 6 is a side view of a four view lenticular stereoscopic display.

As mentioned earlier, the lenticular screen approach can be enhanced by assigning further image strips to each lens. For example, referring to FIGS. 5 and 6, in a four view system, each lens 280 corresponds to four views 241–244, from four cameras instead of two. Repeating double viewing zones are generated instead of the repeating single viewing zone associated with the two view arrangement described with reference to FIGS. 3 and 4. If the observer moves to the left of the display screen, a new image, to left of the previous image, in observed. A reverse stereo zone 290 is produced at the point at which multiple views repeat. The number of reverse stereo zones 290 in the four view image is less than that in the two view image.

Figure 7:
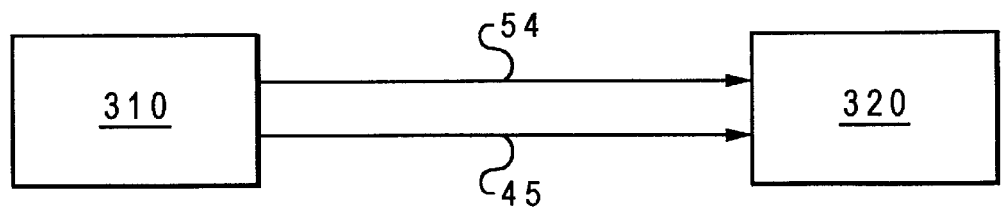
FIG. 7 is a block diagram of an auto-stereoscopic display system embodying the present invention; and, FIG. 8 is a cross-sectional view of a magnetic matrix display device of the auto-stereoscopic display system shown in FIG. 7.
Figure 8:
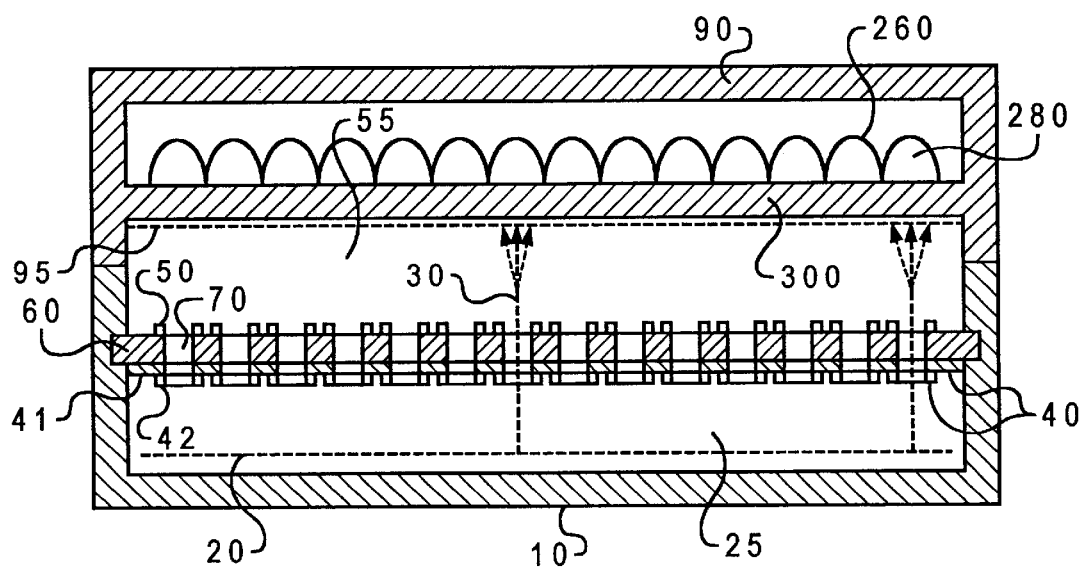

Referring now to FIG. 7, there is provided an auto-stereoscopic display system comprising a video source 310 for supplying digital video data 45 and accompanying clock data 54 to a magnetic matrix display device 320. Video source may comprise for example a graphics adaptor situated in a personal computer system unit. Referring now to FIG. 8, MMD device 320 comprises the features of the device hereinbefore described with reference to FIGS. 1 and 2, together with a lenticular screen 260. Screen 260 is preferably manufactured by resin transfer moulding in the interests of providing accurate dimensions. To prevent outgassing from the resin into the evacuated interior of the MMD device 320, screen 260 is bonded to a relatively thin (typically 1 mm) glass plate 300. In other embodiments of the present invention, glass plate 300 may be sputtered onto the flat surface of screen 260. Phosphor layer 95 is then deposited of the side of plate 300 which, after assembly, faces magnet 60. During assembly, plate 300 is sealed to face-plate 90 to provide a barrier between the resin of screen 260 and the electron active portion of the MMD device 320.

In the device hereinbefore described with reference to FIGS. 1 and 2, suppose that each electron beam 30 focuses down to around 23 micro-metres at around 1 micro-amp of beam current about 0.6 mm from deflection anodes 50. If the pixel spacing is 0.3 mm, then 13 views can be supplied to each pixel. In a monochrome display, the line width is much smaller because the beam currents are lower. Lower beam current can be employed because monochrome phosphors are generally more efficient than colour phosphors. Thus, in particularly preferred embodiment of the present invention, there is provided a 16 view auto-stereoscopic display system based on a monochrome MMD device. Beam indexing via deflection anodes 50 as hereinbefore described is employed to sequentially scan 16 stripes of view data across each pixel width. Such a system is particularly useful in application where a monochrome image is preferred such as medical imaging applications for example.

Suppose now that the pixel spacing in the MMD device hereinbefore described with reference to FIGS. 1 and 2 is 0.63 mm (as in a conventional colour television receiver). In a 16 view colour auto-stereoscopic system there are 48 image slices over three phosphor stripes. The line width required is then 13 micro-metres. In a particularly preferred embodiment of the present invention, there is provided a 16 view colour auto-stereoscopic display system in which the above dimensions are achieved by 0.2 mm diameter pixel wells and a beam stop inserted between magnet 60 and phosphors 95 to trim each 23 micro meter scan line to 13 micrometers. Beam indexing via deflection anodes 50 as hereinbefore described is employed to sequentially scan 48 stripes of view data across the colour sub-pixels in each pixel width.

As mentioned earlier, the pixels in each column of the examples of MMD devices hereinbefore described are simultaneously scanned in parallel. Thus, for a 60 Hz frame rate image and 1024 columns, each column is activated for 16.28 microseconds. For a 16 view monochrome system, each view is then activated for 1.02 micro-seconds. Thus, for a 16 view colour system, each view is activated for 339 nano-seconds. In some preferred embodiments of the present invention, an ultra violet phosphor index stripe is added to permit electronic beam registration. In other embodiments of the present invention, electronic beam registration is facilitated by depositing an ultra violet phosphor over the back of each black matrix separator between adjacent phosphor stripes.

Internal data rates in the examples of MMD devices hereinbefore described with reference to FIGS. 1 and 2 are relatively low compared with those of equivalent CRT and LCD displays. The deserialisation frequency for a 1024×768 MMD device at 60 Hz refresh rate may reach 47 MHz. However, all other frequencies are less than 2.5 MHz. Multiplying these frequencies by 16, however, for a 16 view colour auto-stereoscopic system introduces significant loading on the serial link between the video source 310 and the MMD device 320.

Preferred embodiments of the present invention are provided with means for relieving such loading.

For example, in one preferred embodiment of the present invention, video source 310 supplies MMD device 320 with 16 bit YUV video data instead of 24 bit RGB video data. This incurs a significant reduction in video data rate. In another embodiment of the present invention, video data source 310 supplies compressed digital video to MMD device 320. The video data may be compressed as a function of a video compression algorithm such as MPEG2 or MPEG4. In yet another embodiment of the present invention, video source 310 supplies MMD device 320 with video data corresponding to a fraction of the total number of views. MMD device 320 then interpolates between the views received from video source 310 to produce the total number of views. In yet another embodiment of the present invention, a frame buffer is provided in MMD device 320 for storing the bulk of the video data. Video source 310 then only supplies edge data to MMD device 320. In still another embodiment of the present invention, slow speed static image transmission is employed to transfer video data from video source 310 to a frame buffer in MMD device 320.

In a particularly preferred embodiment of the present invention, video source 310 supplies only two views to MMD device 320. A processor in MMD device 320 then interpolates between the two views to produce a plurality of further views. Video source 310 may generate video data corresponding to the two views in response to inputs from two video cameras. This arrangement is especially suitable for low cost entertainment applications such as three dimensional motion picture features and three dimensional video games. In a modification to this arrangement, a difference transmission technique is employed to transfer the video data from video source 310 to device 320 thereby reducing the transmission bandwidth requirement of the system.

In each of the embodiments of the present invention hereinbefore described, there is provided a multi-view auto-stereoscopic display system based on a magnetic matrix display device 320. An advantage with this arrangement is that, because the MMD device 320 may have a flat faceplate 90 with precise pixel locations, registration of the lenticular screen 260 can be greatly simplified. Another advantage with this arrangement is that, because the lenticular screen 260 can be placed within the MMD device, with the phosphor deposited against the flat surface of the lens array, parallax problems associated with thick screens can be avoided. Yet another advantage with this arrangement is that, because there is a point in the path of each electron beam in the MMD device where the cross-sectional size of each electron beam is a minimum in the horizontal direction, positioning the screen of the MMD at this point produces a very thin vertical line structure. It will be appreciated that beam stops can easily be placed in the aperture to trim the line width further. A further advantage of this arrangement is that the beam indexing scan technique applied to each pixel of the MMD device can be employed to provide the 16 views. Because the MMD illuminates a complete column of pixels at a time, the scanning speed is normally low. Therefore, the deflection system can be easily extended to permit time-multiplexing of 16 views. Still another advantage of this arrangement stems from the relatively low values of the pixel current and EHT voltage in the MMD device. Both can be easily increased to regain brightness lost in time multiplexing the views.

What is claimed is:

1. An auto-stereoscopic display device comprising:

a plane viewing screen; a plane cathode; a plane permanent magnet; a two dimensional array of rows and columns of channels extends between opposite poles of the magnet for receiving electrons from the cathode;

a phosphor layer is disposed between the screen and the magnet and having a plurality of pixels each corresponding to a different channel;

grid electrode means disposed between the cathode and the magnet for selectively controlling flow of electrons from the cathode through each channel to the corresponding pixel in response to input video data;

deflection anode means disposed on the side of the magnet remote from the cathode for sequentially deflecting, orthogonally to the columns, each electron beam to different parts of the corresponding pixel preselected for alignment into respective offset stereo image pairs in response to an input video clock signal; and a lenticular lens array disposed between the phosphor layer and the screen and having a plurality of cylindrical lenses each corresponding to a different column of pixels whereby the stereo image pairs are separated for viewing.

2. A display device as claimed in claim 1, wherein the phosphor coating is deposited on the side of the lens array remote from the screen.

3. A display device as claimed in claim 1, wherein the phosphor coating is deposited on a barrier disposed between the deflection anodes and the lens array.

4. A display device as claimed in claim 3, wherein the barrier comprises a glass layer secured to the lens array.

5. A display device as claimed in claim 1, further comprising interpolating means for interpolating between different views in the video input data to generate one or more additional views.

6. An auto-stereoscopic display system comprising:

a display device having a plane viewing screen, a plane cathode, a plane permanent magnet, a two dimensional array of rows and columns of channels extends between opposite poles of the magnet for receiving electrons from the cathode, a phosphor layer is disposed between the screen and the magnet and having a plurality of pixels each corresponding to a different channel, grid electrode means disposed between the cathode and the magnet for selectively controlling flow of electrons from the cathode through each channel to the corresponding pixel in response to input video data, deflection anode means disposed on the side of the magnet remote from the cathode for sequentially deflecting, orthogonally to the columns, each electron beam to different parts of the corresponding pixel preselected for alignment into respective offset stereo image pairs in response to an input video clock signal, and a lenticular lens array disposed between the phosphor layer and the screen and having a plurality of cylindrical lenses each corresponding to a different column of pixels for optically separating respective image pairs;

a video data source for generating the input video data and the video clock signal; and a communication link for transferring the input video data and the video clock signal from the video data source to the display device.

7. An auto-stereoscopic display system as claimed in claim 6, wherein the communication link comprises compression means for compressing the input video data for transfer from the video source to the display device.

\* \* \* \* \*